United States Patent
Zerbe et al.

(10) Patent No.: US 7,132,113 B2
(45) Date of Patent: Nov. 7, 2006

(54) FLAVORED FILM

(75) Inventors: Horst G. Zerbe, Hudson (CA); Fadia Al-Khalil, Lincoln Park, NJ (US)

(73) Assignee: Intelgenx Corp. (CA)

( * ) Notice: Subject to any disclaimer, the term of this patent is extended or adjusted under 35 U.S.C. 154(b) by 515 days.

(21) Appl. No.: 10/123,142

(22) Filed: Apr. 16, 2002

(65) Prior Publication Data

US 2003/0053962 A1    Mar. 20, 2003

Related U.S. Application Data

(63) Continuation-in-part of application No. 09/884,112, filed on Jun. 19, 2001, now Pat. No. 6,660,292.

(51) Int. Cl.
*A61K 47/00* (2006.01)
*A61K 9/00* (2006.01)

(52) U.S. Cl. ...................................... 424/439; 424/400

(58) Field of Classification Search ................ 424/400, 424/439, 49
See application file for complete search history.

(56) References Cited

U.S. PATENT DOCUMENTS

| | | | |
|---|---|---|---|
| 3,753,732 A | | 8/1973 | Boroshok |
| 4,136,145 A | | 1/1979 | Fuchs et al. |
| 4,136,162 A | | 1/1979 | Fuchs et al. |
| 4,713,239 A | | 12/1987 | Babaian et al. |
| 4,842,854 A | | 6/1989 | Babaian et al. |
| RE33,093 E | | 10/1989 | Schiraldi et al. |
| 4,900,552 A | | 2/1990 | Sanvordeker et al. |
| 4,921,695 A | | 5/1990 | Babaian et al. |
| 4,925,670 A | | 5/1990 | Schmidt |
| 5,004,595 A | * | 4/1991 | Cherukuri et al. |
| 5,047,244 A | | 9/1991 | Sanvordeker et al. |
| 5,234,957 A | | 8/1993 | Mantelle |
| 5,332,576 A | | 7/1994 | Mantelle |
| 5,354,551 A | * | 10/1994 | Schmidt |
| 5,433,960 A | * | 7/1995 | Meyers ........................... 426/5 |
| 5,446,070 A | | 8/1995 | Mantelle |
| 5,456,920 A | * | 10/1995 | Matoba et al. ............... 424/465 |
| 5,462,749 A | | 10/1995 | Rencher |
| 5,470,581 A | * | 11/1995 | Grillo et al. .................. 424/479 |
| 5,700,478 A | | 12/1997 | Biegajski et al. |
| 5,948,430 A | * | 9/1999 | Zerbe et al. .................. 424/435 |
| 5,955,126 A | * | 9/1999 | Jon et al. ..................... 426/105 |
| 6,231,957 B1 | * | 5/2001 | Zerbe et al. .................. 428/220 |
| 6,596,298 B1 | * | 7/2003 | Leung et al. |

FOREIGN PATENT DOCUMENTS

| | | |
|---|---|---|
| AU | 601478 | 9/1987 |
| AU | A 75496/96 | 7/1997 |
| DE | 2148159 | 8/1972 |
| EP | 0109269 | 5/1984 |
| EP | 0250187 | 12/1987 |
| EP | 0273069 | 7/1988 |
| EP | 0452446 | 10/1991 |
| GB | 853378 | 11/1960 |
| GB | 2048642 | 12/1980 |
| WO | 92/15289 | 9/1992 |
| WO | 98/20862 | 5/1998 |

OTHER PUBLICATIONS

Chemical Abstracts, vol. 97, 1982, p. 487, Abstract No. 4931e, Columbus, Ohio, USA.
Chemical Abstracts, vol. 100, 1984, p. 530, Abstract No. 137715q, Columbus, Ohio USA.
Patent Abstracts of Japan, JP-A-57028102 (Sanei Chem Ind Ltd), Feb. 15, 1982.

* cited by examiner

*Primary Examiner*—Humera N. Sheikh
(74) *Attorney, Agent, or Firm*—Price, Heneveld, Cooper, DeWitt & Litton, LLP

(57) ABSTRACT

An improved rapidly disintegrating flavored film that quickly and completely disintegrates upon contact with mucosal tissue in the oral cavity of a human includes a hydroxypropyl cellulose, a modified starch and a flavor ingredient. The flavored films of this invention completely disintegrate upon contact with the mucosal tissue in less than a minute, and often in less than 30 seconds, whereas previously known flavored films typically do not complete dissolve, or do not dissolve as rapidly, upon contact with mucosal tissue in the oral cavity of a human. The flavored films of this invention may be advantageously employed as breath freshening films, and in food items to impart flavor and, optionally, to impart functional qualities to the food item.

36 Claims, No Drawings

FLAVORED FILM

CROSS REFERENCE TO RELATED APPLICATIONS

This is a Continuation-In-Part of application Ser. No. 09/884,112, filed Jun. 19, 2001, now U.S. Pat No. 6,660,292.

FIELD OF THE INVENTION

This invention relates generally to flavored films and more particularly to edible films used in foods, on foods, or alone, such as in a breath freshening film.

BACKGROUND OF THE INVENTION

Water-soluble films for oral administration of therapeutic agents are well known in the art. It is also known in the art to use such films for administering a breath freshening agent, e.g., menthol. The known films for administering breath freshening agents and/or active pharmaceutical agents are generally comprised of at least one water-soluble polymer suitable for human consumption and at least one compound that enhances the wettability of the water-soluble polymer, typically selected from polyalcohols, surfactants and plasticizers. For example, U.S. Pat. No. 5,948,430 describes a monolayer film which can be adhered to the oral cavity to release a pharmaceutically or cosmetically active ingredient, wherein the film comprises at least one water-soluble polymer; at least one member selected from the group consisting of a polyalcohol, a surfactant and a plasticizer; at least one cosmetic or pharmaceutically active ingredient; and a flavoring agent.

While the disclosed monolayer films dissolve completely without leaving any residue in the presence of sufficient moisture, higher dissolution rates which can be achieved with exposure to lower amounts of moisture are desirable for certain applications. For example, it is highly desirable that a breath freshening film dissolve rapidly in the oral cavity regardless of the moisture level of the mucosal tissue contacting the film. More rapid disintegration of flavored films than is available with known muco-adhesive films may also be desired for use in food items such as poultry, pastries, candies and other confections, etc. In such applications, it may be desirable to impart a localized burst of flavor to the food item using a flavored film that dissolves very rapidly even in the presence of low amounts of moisture.

U.S. Pat. No. 5,700,478 describes a laminated device for controlled release of a substance within a mucosa-lined body cavity including a water-soluble adhesive layer comprised of a water-soluble polymer and a water-soluble plasticizer, and a water-soluble polymer layer. Rather than teaching a rapidly dissolving flavored film, this patent teaches a multiple layer laminate that dissolves relatively slowly for controlled or sustained release of a substance.

U.S. Pat. No. 4,900,552 describes a trilaminate film suitable for prolonged and sustained delivery of an active ingredient in a buccal cavity. The trilaminate includes a hydratable muco-adhesive base layer; a non-adhesive reservoir layer; and a water-impermeable barrier sandwiched between and bonded to the base layer and the reservoir layer. Rather than teaching a rapidly disintegrating film, this patent discloses slowly disintegrating films for prolonged or sustained release of a substance.

U.S. Pat. No. 5,047,244 discloses a therapeutic dosage form comprising an anhydrous but hydratable monolithic polymer matrix that contains amorphous fumed silica as well as a therapeutic agent, and a water-insoluble barrier layer secured to the polymer matrix and defining a non-adhesive face. This patent does not disclose rapidly disintegrating films, but instead contemplates compositions that are capable of providing improved availability of therapeutic agents from a controlled release muco-adhesive carrier system.

SUMMARY OF THE INVENTION

It has been discovered that flavored films which disintegrate more rapidly than previously known flavored films can be obtained by replacing the polymers used in the known flavored films with hydroxypropyl cellulose and modified starch.

In accordance with one aspect of the invention, a breath film is provided which comprises hydroxypropyl cellulose, modified starch, and flavor ingredient.

In accordance with another aspect of the invention, a multiple layer breath freshening film is provided which includes a first layer having at least one hydroxypropyl cellulose, at least one modified starch, and at least one flavoring ingredient; and a second layer including at least one water-soluble polymer and a second flavoring ingredient.

In accordance with a further aspect of this invention, there is provided a multiple layer flavored film, that may be used as a food additive or ingredient, that includes a first layer having at least one hydroxypropyl cellulose, at least one modified starch, and at least one flavor ingredient; and a second layer for delivering a second flavor or ingredient or for imparting a textural or functional quality.

These and other features, advantages and objects of the present invention will be further understood and appreciated by those skilled in the art by reference to the following specification and claims.

DESCRIPTION OF THE PREFERRED EMBODIMENTS

This invention pertains to rapidly disintegrating edible flavored films that may be used for administration of breath freshening agents, or as ingredients in or on foods. The rapidly disintegrating edible films of this invention may be used to impart a flavor or combination of flavors to various food items including cookies, pastries, candies and other confectioneries, etc. As disclosed in related patent application Ser. No. 09/884,112, the films of this invention are also suitable for application to various cooked foods (e.g., hamburger patties, chicken, pizza), either before, during or after cooking, to impart various flavors to the food, such as a barbecue flavor.

It has been discovered that a combination of hydroxypropyl cellulose and a modified starch provides improved solubility properties that enable rapid disintegration of the film upon contact with even low levels of moisture. The improved rapid disintegration properties of the flavored films of this invention are believed to be attributable to the excellent properties of the modified starch as a disintegrant. Also, the improved water dissolution kinetics of hydroxypropyl cellulose as compared with conventional film polymers such as polyvinylpyrrolidone and hydroxypropylmethyl cellulose impart rapid disintegration properties to the films of this invention.

Hydroxypropyl cellulose is a cellulose ether with hydroxypropyl substitution. Hydroxypropyl cellulose is also a nonionic, water-soluble, film-forming polymer. The concentration of polymer base in the film should be sufficient to be able to hold the amount of flavor oil or flavor emulsion required for the particular application. The total concentration of solids in the coating solution should range between 5 and 50%. The viscosity of the coating solution increases with the concentration of solids. Conveniently, hydroxypropyl cellulose is commercially available in a variety of molecular weights which can be blended with water and other ingredients to achieve a desired viscosity that is conducive for processing and handling of the solution prior to evaporation of the water to form the desired flavored film. Examples of commercially available hydroxypropyl cellulose materials that can be used in preparing the flavored films of this invention include Klucel® EF and Klucel® GF, which are marketed by Aqualon Company of Hercules Incorporated. Klucel® EF hydroxypropyl cellulose has a weight average molecular weight of about 80,000 and Klucel® GF has a weight average molecular weight of about 300,000.

Modified starches include any of several water-soluble polymers derived from a starch (e.g., corn starch, potato starch, tapioca starch) such as by acetylation, halogenation, hydrolysis (e.g., such as which an acid), or enzymatic action. Generally, any type of water-soluble modified starch, including but not limited to oxidized, ethoxyolated, cationic, lypophilic and pearl starch, may be used. Maltodextrins are a preferred class of modified starches obtained by hydrolysis. Commercially available maltodextrins that may be used in preparing the flavored films of this invention include Maltrin® M100, Maltrin® M180, Maltrin® QD M550, and Maltrin® QD M600, marketed by Grain Processing Corporation. Another commercially available modified starch that may be advantageously employed in preparing the rapidly disintegratable flavored films of this invention is Pure-Cote® B792 modified corn starch, also available from Grain Processing Corporation.

On a moisture free basis, the flavored films of this inventions typically contain, on a weight basis, from about 20% to about 70% hydroxypropyl cellulose, from about 5% to about 70% modified starch, and up to about 60% of a flavor ingredient. The flavored films may contain other ingredients, including surfactants, wetting agents, other film-forming polymers, and other ingredients.

In certain applications, it may be desirable to increase the wettability of the film by adding surfactants. Examples of edible non-ionic surfactants that may be used include polyoxyethylene sorbitan fatty acid esters, polyoxyethylene alkyl ethers, and polyoxyethylene caster oil derivatives. An example of a suitable commercially available surfactant that may be used is polysorbate 80, which is a mixture of oleate esters of sorbitol and sorbitol anhydrides, consisting predominantly of the monoester, condensed with approximately 20 moles of ethylene oxide. Polysorbate 80 is sold as Tween® 80 by ICI Surfactants. HLB value of the polyoxyethylene sorbitan fatty acid ester should be greater than 10, but should not exceed 20. The inclusion of a surfactant has proven very beneficial in many cases. For example, a flavored film having a length, width, and thickness suitable for delivering an effective amount of a breath freshening agent, comprising a modified starch, hydroxypropyl cellulose and a surfactant will typically disintegrate upon placement in the oil cavity of a human in less than 15 seconds.

While starch provides the film with an initial tortuosity level, the tortuosity of a flavored film can be further increased and adjusted to the desired level by adding a water-soluble component such as sorbitol, a gel-former such as silicon dioxide, or liquids that are miscible with water, such as propylene glycol, glycerin, polyethylene-glycol sorbitan oleate, or the like.

The tensile strength of the flavored films may be improved by adding a film-forming polymer, or mixtures of such film-forming polymers. Suitable film-forming agents include a variety of natural or synthetic polymers that improve the coherence of the three-dimensional network of the polymer matrix such as through hydrogen bonding. In order to be compatible with the polymer base solution, the film-forming agents have to be soluble or swellable in water. Examples of suitable film-formers that are soluble or swellable in water include polyvinyl alcohol, natural and synthetic gums like guar gum, xanthan gum, gum arabic, cellulose gum, acacia gum, tragacantha, sodium alginate, sodium carboxymethyl cellulose, hydroxyethyl cellulose, gelatin, polycarbophil, acrylate-based water-dispersible resins like methyl methacrylate copolymers, or other suitable water-soluble or swellable polymers. Because the water solubility of these film-forming agents is usually poor, the concentration of the film-forming agent should be optimized to provide a good balance of rapid disintegrating properties (upon contact with a precooked food item) and good tensile strength (to allow the flavored film to be easily removed from a carrier substrate without breaking).

An attempt to replace the starch in the polymer base completely by film-forming agents such as cellulose gum or gelatin to achieve better film properties was unsuccessful. The resulting film properties were poor, indicating that the presence of a modified starch in the film is required to achieve the desired film properties. A comparison is shown in the following table.

|  | Polymer Base Solution: | | | |
| --- | --- | --- | --- | --- |
|  | PB 1 | | PB 2 | |
|  | weight (g) | % | Weight (g) | % |
| Water | 750.0 | 87.9 | 150.0 | 88.1 |
| Premix 1: | | | | |
| Kollidon 30 | 29.5 | 3.5 | 5.9 | 3.5 |
| Cellulose Gum | 29.5 | 3.5 | — | — |
| Gelatin | — | — | 5.9 | 3.5 |
| Premix 2: | | | | |
| HPC GF | 21.0 | 2.5 | 4.2 | 2.5 |
| HPC EF | 23.0 | 2.7 | 4.2 | 2.5 |
| | 853.0 | 100.0 | 170.2 | 100.0 |

While the film obtained with PB 1 was too soft, the film resulting from PB 2 was too brittle.

The flavor ingredients used in the flavored films of this invention may include any of various natural and/or artificial flavor components. Examples include various citrus flavors (e.g., lemon, lime, orange and combinations thereof), other fruit flavors (e.g., apple, cherry, peach and others), spearmint, peppermint, chocolate, vanilla, cinnamon, etc.

The flavored films of this invention may be prepared by mixing the hydroxypropyl cellulose, modified starch, flavoring and other ingredients in water to produce a solution that is coated onto a suitable carrier substrate, and dried to form a flavored film. The carrier substrate has to have release characteristics that ensure good removal of the film upon drying. Suitable carrier substrates include siliconized or polyethylene-impregnated kraft-paper, siliconized polyethylene-terephthalate film, polyethylene film, and the like.

The flavored films of this invention will typically disintegrate upon contact with mucosal tissue in the oral cavity in less than a minute, and preferably will disintegrate in less than 30 seconds, and in some embodiments less than 15 seconds, without leaving any noticeable residue. The invention thus facilitates rapid, uniform, and consistent flavored delivery upon contact with mucosal tissue in the oral cavity of a human.

In accordance with certain embodiments of the invention, a multiple layer breath freshening film or multiple layer flavored film includes a first layer having at least one flavor ingredient, and a second layer having at least one different flavor ingredient. For example, the first layer can contain a fruit flavor, and the second layer can contain menthol alone or as part of a mint flavor. Depending on the thicknesses of the layers, and the manner in which the multiple layer film is used and applied, various taste characteristics may be achieved, such as sequential flavoring characteristics.

The films of this invention are not particularly limited as to thickness. However, suitable thicknesses for the breath freshening and other flavored films of this invention (whether single layer or multiple layer) will typically range from about 10 micrometers to about 200 micrometers. However, thicker or thinner films are possible, and may be useful in certain applications.

The following examples illustrate certain embodiments of the invention. However, it should be understood that other embodiments containing other flavor ingredients, such as fruit flavors, mint flavors, menthol, etc. may be employed in breath freshening films and other flavored films. The flavored films of this invention may be used in or on various foods, including cooked foods, baked foods, confectioneries, etc.

EXAMPLES

Polymer Base Solution:

A typical example of the polymer base solution according to the new composition and the process for preparing it are as follows:

| Composition: | | |
|---|---|---|
| | % | g |
| Water | 81.3 | 750.0 |
| Premix 1: | | |
| Purecote B792 | 9.3 | 85.5 |
| Maltrin QD600 | 3.1 | 28.5 |
| Premix 2: | | |
| HPC GF | 3.1 | 28.5 |
| HPC EF | 3.2 | 29.9 |
| | 100.0 | 922.4 |

Preparation: Heat 350 ml water to 60° C. and slowly add premix 1. Mix until clear solution has been formed using high-shear mixer. Cool to room temperature (1). To 300 ml water, slowly add premix 2 under stirring (high-shear mixer) until a clear solution has been formed (2). Combine (1) and (2).

| Final Coating Solutions: | | | |
|---|---|---|---|
| Flavor | % Flavor Emulsion | % Tween 80 | % Polymer Base Solution |
| Garlic | 25 | 3.5 | 71.5 |
| Montreal | 22 | 4 | 74 |
| Carribean | 17 | 4 | 79 |
| Bacon | 25 | 3.5 | 71.5 |
| Lemon Pepper | 17 | 3 | 80 |
| Woodfired Smoke | 7 | 3 | 90 |

Preparation:

The surfactant is added to the polymer base solution in a quantity according to table B. After mixing, the flavor emulsion is added slowly under stirring using a stirrer bar.

Coating:

Under laboratory conditions, the final coating solution is coated onto a suitable substrate using a suitable coating device, like a Meyer rod or knife-over-roll coater. Under production conditions, coating is performed using a knive-over-roll, gravure, reverse-roll, slot-die, or other suitable coating device. The film is dried using hot air. Pre-drying using infrared radiators may be suitable.

Converting:

After leaving the drying oven, the dry film is slit and rewound. If necessary for farther processing, the film is sprinkled with a thin layer of corn starch or any other suitable absorbant prior to rewinding to prevent sticking.

Solutions A through D' were prepared having the compositions tabulated below. The solutions were coated onto a suitable carrier substrate and dried to form a film. Thereafter the films were placed on cooked hamburgers and the time to disintegration was recorded. Also, the tensile strength and cohesiveness of the films was rated on a scale of 1 to 10, with a 1 indicating poor tensile strength and cohesion wherein the film tears immediately upon being subjected to tension, and a rating of 10 indicating good tensile strength and cohesiveness wherein film breakage does not occur even under strong tension.

| | Weight % | | | | |
|---|---|---|---|---|---|
| Compound | A | B | C | D | E |
| Klucel EF | 5.0 | 4.9 | 4.9 | 4.9 | 4.6 |
| Klucel GF | 5.0 | 4.9 | 4.9 | 4.9 | 4.6 |
| Purecote B792 | 0.9 | 1.7 | 1.1 | 1.1 | 1.9 |
| Maltrin M100 | 1.4 | 0.0 | 0.0 | 0.0 | 0.0 |
| Maltrin M180 | 0.0 | 0.0 | 2.1 | 0.0 | 0.0 |
| Maltrin QD M550 | 0.0 | 0.0 | 0.0 | 1.1 | 0.0 |
| Maltrin QD M600 | 0.0 | 0.0 | 0.0 | 0.0 | 1.9 |
| Water | 82.9 | 83.8 | 83.2 | 84.1 | 83.0 |
| Flavor (Smoke) | 3.8 | 3.8 | 3.8 | 3.8 | 3.8 |
| Glycerin | 1.0 | 1.0 | 0.0 | 0.0 | 0.0 |
| Total | 100.0 | 100.0 | 100.0 | 100.0 | 100.0 |
| Disintegration | 30 sec. | 30 sec. | 30 sec. | 30 sec. | 35 sec. |
| Tensile Strength | 4.0 | 6.0 | 4.0 | 3.0 | 7.0 |

| | Weight % | | | | |
|---|---|---|---|---|---|
| Compound | F | G | H | I | J |
| Klucel EF | 4.6 | 4.9 | 5.1 | 3.2 | 3.0 |

-continued

| Compound | | | | | |
|---|---|---|---|---|---|
| Klucel GF | 4.2 | 4.4 | 4.7 | 2.7 | 2.5 |
| Purecote B792 | 2.0 | 1.7 | 1.5 | 5.4 | 4.9 |
| Maltrin QD M550 | 2.0 | 1.7 | 1.5 | | |
| Maltrin QD M600 | 2.0 | 1.7 | 1.5 | 5.4 | 4.9 |
| Water | 85.2 | 85.5 | 85.8 | 72.9 | 66.7 |
| Flavor | | | | 7.6 | 14.8 |
| Glycerin | | | | 2.7 | 3.3 |
| Total | 100.0 | 100.0 | 100.0 | 100.0 | 100.0 |
| Disintegration | 22 sec. | 22 sec. | 25 sec. | 40 sec. | 50 sec. |
| Tensile Strength | 5.0 | 6.0 | 7.0 | 7.0 | 8.0 |

| | Weight % | | | |
|---|---|---|---|---|
| Compound | K | L | M | N |
| Klucel EF | 3.3 | 3.3 | 3.2 | 3.1 |
| Klucel GF | 2.7 | 2.7 | 2.7 | 2.6 |
| Purecote B792 | 5.5 | 5.5 | 5.4 | 5.1 |
| Maltrin QD M600 | 5.5 | 5.5 | 5.4 | 5.1 |
| Water | 73.6 | 73.6 | 72.3 | 69.5 |
| Tween 80 | 1.8 | 0.0 | 1.8 | 1.7 |
| Maillose | 0.0 | 1.8 | 1.8 | 0.0 |
| Flavor | 7.7 | 7.7 | 7.6 | 12.8 |
| Total | 100.0 | 100.0 | 100.0 | 100.0 |
| Disintegration | 35 sec. | 65 sec. | 45 sec. | >60 sec. |
| Tensile Strength | 6.0 | 6.0 | 5.0 | 8.0 |

| | Weight % | | | | | |
|---|---|---|---|---|---|---|
| Compound | O Garlic | P Montr. | Q Woodf. | R Bacon | S Cheese | T Lemon P. |
| Klucel EF | 3.17 | 3.04 | 3.35 | 3.17 | 3.17 | 3.22 |
| Klucel GF | 3.03 | 2.91 | 3.20 | 3.03 | 3.03 | 3.08 |
| Purecote B792 | 4.13 | 3.97 | 4.37 | 4.13 | 4.13 | 4.20 |
| Maltrin QD M600 | 1.38 | 1.32 | 1.46 | 1.38 | 1.38 | 1.40 |
| Water | 71.63 | 68.76 | 75.73 | 71.63 | 71.63 | 72.84 |
| Tween 80 | 4.17 | 4.00 | 4.41 | 4.17 | 4.17 | 2.54 |
| Flavor | 12.50 | 16.00 | 7.49 | 12.50 | 12.50 | 12.71 |
| Total | 100.00 | 100.00 | 100.00 | 100.00 | 100.00 | 100.00 |
| Disintegration | 15 sec. | 15 sec. | 20 sec. | 15 sec. | 15 sec. | 15 sec. |
| Tensile Strength | 6.0 | 6.0 | 7.0 | 6.0 | 5.0 | 6.0 |

| | Weight % | | | | | |
|---|---|---|---|---|---|---|
| Compound | U Garlic | V Montr. | W Woodf. | X Bacon | Y Cheese | Z Lemon P. |
| Klucel EF | 3.22 | 3.09 | 3.41 | 3.22 | 3.22 | 3.22 |
| Klucel GF | 3.08 | 2.96 | 3.26 | 3.08 | 3.08 | 3.08 |
| Purecote B792 | 4.20 | 4.03 | 4.45 | 4.20 | 4.20 | 4.20 |
| Maltrin QD M600 | 1.40 | 1.34 | 1.48 | 1.40 | 1.40 | 1.40 |
| Water | 72.84 | 69.88 | 77.09 | 72.84 | 72.84 | 72.84 |
| Tween 80 | 2.54 | 2.44 | 2.69 | 2.54 | 2.54 | 2.54 |
| Flavor | 12.71 | 16.26 | 7.62 | 12.71 | 12.71 | 12.71 |
| Total | 100.00 | 100.00 | 100.00 | 100.00 | 100.00 | 100.00 |
| Disintegration | 25 sec. | 25 sec. | 35 sec. | 28 sec. | 29 sec. | 25 sec. |
| Tensile Strength | 7.0 | 7.0 | 7.5 | 7.0 | 6.0 | 7.0 |

Disintegration: Time in seconds on cooked hamburger
Tensile Strength; Scale 1 to 10
1 = poor tensile strength and cohesion of film; tears immediately under tension
10 = good tensile strength and cohesion of film; no web break even under strong tension The flavored films of this invention typically disintegrated in less than 60 seconds, with most of the films disintegrating in about 30 seconds or less, and many of the films disintegrating in about 15 seconds.

The above description is considered that of the preferred embodiments only. Modifications of the invention will occur to those skilled in the art and to those who make or use the invention. Therefore, it is understood that the embodiments described above are merely for illustrative purposes and not intended to limit the scope of the invention, which is defined by the following claims as interpreted according to the principles of patent law, including the doctrine of equivalents.

The invention claimed is:

1. A breath freshening comestible comprising:
a film containing at least one hydroxypropyl cellulose;
at least one modified starch;
at least one surfactant; and
at least one flavor ingredient, the amounts of the hydroxypropyl cellulose, modified starch, surfactant, flavor ingredient, and any optional ingredients selected to provide a film that rapidly disintegrates in water without leaving a noticeable residue.

2. The breath freshening comestible of claim 1, wherein the modified starch is maltodextrin.

3. The breath freshening comestible of claim 1, wherein the film comprises, on a moisture-free weight basis, from about 20% to about 70% hydroxypropyl cellulose, from about 5% to about 70% modified starch, and up to about 60% of a flavor ingredient.

4. The breath freshening comestible of claim 1, wherein the surfactant is a polyoxyethylene sorbitan fatty acid ester.

5. The breath freshening comestible of claim 1, wherein the surfactant is polysorbate 80.

6. The breath freshening comestible of claim 1, wherein the surfactant has an HLB of from about 10 to about 20.

7. The breath freshening comestible of claim 1, further comprising a film-forming polymer.

8. The breath freshening comestible of claim 7, wherein the film-forming polymer is selected from the group consisting of guar gum, xanthan gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

9. A breath freshening comestible of claim 1, wherein the flavor ingredient includes menthol.

10. A multiple layer breath freshening film comprising:
a first layer including at least one hydroxypropyl cellulose, at least one modified starch, at least one surfactant and at least one flavor ingredient; and
at least one other layer including a water-soluble polymer and a second flavor ingredient.

11. The multiple layer breath freshening film of claim 10, wherein the modified starch is maltodextrin.

12. The multiple layer breath freshening film of claim 10, wherein the first layer comprises, on a moisture-free weight basis, from about 20% to about 70% hydroxypropyl cellulose, from about 5% to about 70% modified starch, and up to about 60% of a flavor ingredient.

13. The multiple layer breath freshening film of claim 10, wherein the surfactant is a polyoxyethylene sorbitan fatty acid ester.

14. The multiple layer breath freshening film of claim 10, wherein the surfactant is polysorbate 80.

15. The multiple layer breath freshening film of claim 10, wherein the surfactant has an HLB of from about 10 to about 20.

16. The multiple layer breath freshening film of claim 10, wherein the first layer further comprises a film-forming polymer.

17. The multiple layer breath freshening film of claim 16, wherein the film-forming polymer is selected from the group consisting of guar gum, xanthan gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

18. The multiple layer breath freshening film of claim 10, wherein at least one of the flavor ingredients includes menthol.

19. A multiple layer comestible comprising:
a first flavored film layer including at least one hydroxypropyl cellulose, at least one modified starch, at least one surfactant and at least one flavor ingredient; and
a second layer for delivering a second flavor or ingredient or for imparting a functional quality.

20. The multiple layer comestible of claim 19, wherein the modified starch is maltodextrin.

21. The multiple layer comestible of claim 19, wherein the first layer comprises, on a moisture-free weight basis, from about 20% to about 70% hydroxypropyl cellulose, from about 5% to about 70% modified starch, and up to about 60% of a flavor ingredient.

22. The multiple layer comestible of claim 19, wherein the surfactant is a polyoxyethylene sorbitan fatty acid ester.

23. The multiple layer comestible of claim 19, wherein the surfactant is polysorbate 80.

24. The multiple layer comestible of claim 19, wherein the surfactant has an HLB of from about 10 to about 20.

25. The multiple layer comestible of claim 19, wherein the first layer further comprises a film-forming polymer.

26. The multiple layer comestible of claim 25, wherein the film-forming polymer is selected from the group consisting of guar gum, xanthan gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

27. The multiple layer comestible of claim 19, wherein at least one of the flavor ingredients includes menthol.

28. A flavored food comprising:
a food item; and
a flavored film including at least a first layer having at least one hydroxypropyl cellulose, at least one modified starch, at least one surfactant and at least one flavor ingredient, the amounts of hydroxypropyl cellulose, modified starch, surfactant, flavor ingredient, and any optional ingredient selected to provide a film that rapidly disintegrates in water without leaving a noticeable residue, said flavored film being disposed on or in the food item.

29. The flavored food of claim 28, wherein the modified starch is maltodextrin.

30. The flavored food of claim 28, wherein the first layer comprises, on a moisture-free weight basis, from about 20% to about 70% hydroxypropyl cellulose, from about 5% to about 70% modified starch, and up to about 60% of a flavor ingredient.

31. The flavored food of claim 28, wherein the surfactant is a polyoxyethylene sorbitan fatty acid ester.

32. The flavored food of claim 28, wherein the surfactant is polysorbate 80.

33. The flavored food of claim 28, wherein the surfactant has an HLB of from about 10 to about 20.

34. The flavored food of claim 28, wherein the first layer further comprises a film-forming polymer.

35. The flavored food of claim 24, wherein the film-forming polymer is selected from the group consisting of guar gum, xanthan gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

36. The flavored food of claim 28, wherein at least one of the flavor ingredients includes menthol.

* * * * *

UNITED STATES PATENT AND TRADEMARK OFFICE
CERTIFICATE OF CORRECTION

PATENT NO. : 7,132,113 B2 Page 1 of 1
APPLICATION NO. : 10/123142
DATED : November 7, 2006
INVENTOR(S) : Horst G. Zerbe et al.

It is certified that error appears in the above-identified patent and that said Letters Patent is hereby corrected as shown below:

Title Page, item [57]

Abstract:
Line 10, "complete" should be --completely--.

Column 3:
Line 24, "which" should be --with--.
Line 39, "inventions" should be --invention--.
Line 50, "conmercially" should be --commercially--.
Line 63, "oil cavity" should be --oral cavity--.

Column 10:
Claim 35, line 32, "claim 24" should be --claim 34--.

Signed and Sealed this

Thirteenth Day of March, 2007

JON W. DUDAS
*Director of the United States Patent and Trademark Office*